(12) United States Patent
Zheng et al.

(10) Patent No.: US 10,936,861 B2
(45) Date of Patent: Mar. 2, 2021

(54) OBJECT DETECTION SYSTEM OF A VEHICLE

(71) Applicant: Aptiv Technologies Limited, St. Michael (BB)

(72) Inventors: Yang Zheng, Winnetka, CA (US); Izzat H. Izzat, Simi Valley, CA (US)

(73) Assignee: Aptiv Technologies Limited, St. Michael (BB)

( * ) Notice: Subject to any disclaimer, the term of this patent is extended or adjusted under 35 U.S.C. 154(b) by 96 days.

(21) Appl. No.: 16/270,105

(22) Filed: Feb. 7, 2019

(65) Prior Publication Data

US 2020/0104584 A1   Apr. 2, 2020

Related U.S. Application Data

(60) Provisional application No. 62/737,970, filed on Sep. 28, 2018.

(51) Int. Cl.
*G06T 7/521* (2017.01)
*G06K 9/00* (2006.01)
(Continued)

(52) U.S. Cl.
CPC ....... *G06K 9/00369* (2013.01); *G06K 9/4652* (2013.01); *G06K 9/629* (2013.01); *G06K 9/6267* (2013.01); *G06K 9/6293* (2013.01); *G06T 7/521* (2017.01); *G06T 7/73* (2017.01); *H04N 5/332* (2013.01); *H04N 9/09* (2013.01);
(Continued)

(58) Field of Classification Search
None
See application file for complete search history.

(56) References Cited

U.S. PATENT DOCUMENTS

| 2014/0169623 A1* | 6/2014 | Liu | G06K 9/00335 382/103 |
| 2019/0146500 A1* | 5/2019 | Yalla | G01C 21/3407 701/25 |

(Continued)

OTHER PUBLICATIONS

Kim Jaekyum et al: "Robust Camera Lidar Sensor Fusion Via Deep Gated Information Fusion Network", Jun. 26, 2018, pp. 1620-1625.
(Continued)

*Primary Examiner* — Fayyaz Alam
(74) *Attorney, Agent, or Firm* — Colby Nipper PLLC

(57) ABSTRACT

An object detection system includes color and infrared cameras, a controller-circuit, and instructions. The color and infrared cameras are configured to output respective color image and infrared image signals. The controller-circuit is in communication with the cameras, and includes a processor and a storage medium. The processor is configured to receive and transform the color image and infrared image signals into classification and location data associated with a detected object. The instructions are stored in the at least one storage medium and executed by the at least one processor, and are configured to utilize the color image and infrared image signals to form respective first and second maps. The first map has a first plurality of layers, and the second map has a second plurality of layers. Selected layers from each are paired and fused to form a feature pyramid that facilitates formulation of the classification and location data.

21 Claims, 8 Drawing Sheets

(51) Int. Cl.
*G06T 7/73* (2017.01)
*G06K 9/46* (2006.01)
*G06K 9/62* (2006.01)
*H04N 5/33* (2006.01)
*H04N 9/09* (2006.01)
*G05D 1/02* (2020.01)

(52) U.S. Cl.
CPC ......... *G05D 1/0242* (2013.01); *G05D 1/0246* (2013.01); *G06T 2207/20084* (2013.01); *G06T 2207/30236* (2013.01); *G06T 2207/30261* (2013.01)

(56) References Cited

U.S. PATENT DOCUMENTS

2019/0147245 A1* 5/2019 Qi ..................... G06K 9/00208
 382/103
2020/0025935 A1* 1/2020 Liang ................ G06K 9/00201

OTHER PUBLICATIONS

Yang Zheng et al: GFD-SSD: Gated Fusion Double SSD for Multispectral Pedestrian Detection, Mar. 16, 2019, the whole document.
European Search Report for Application No. EP19193779, European Patent Office, dated Jan. 15, 2020.

* cited by examiner

OBJECT DETECTION SYSTEM OF A VEHICLE

CROSS-REFERENCES TO RELATED APPLICATIONS

This patent application claims priority to U.S. Provisional Patent Application No. 62/737,970, filed Sep. 28, 2018, which is incorporated herein by reference in its entirety.

BACKGROUND OF THE INVENTION

The present disclosure relates to object detection systems, and more specifically, to a pedestrian detection system and method of operation.

Pedestrian detection is a task for many applications including, for example, the area of autonomous driving of a vehicle. The detection of pedestrians is an important attribute of an autonomous vehicle before the vehicle may be deployed on urban streets. More currently, artificial intelligence, has made progress in the study of pedestrian detection. However, further improvements are desirable especially in environments such as weak illumination, far distance, and occlusion of pedestrians.

Accordingly, it is desirable to further develop and improve object detection systems.

SUMMARY OF THE INVENTION

An object detection system according to one, non-limiting, exemplary embodiment of the present disclosure includes color and infrared cameras, a controller-circuit, and instructions. The color and infrared cameras are configured to output respective color image and infrared image signals. The controller-circuit is in communication with the cameras, and includes a processor and a storage medium. The processor is configured to receive and transform the color image and infrared image signals into classification and location data associated with a detected object. The instructions are stored in the at least one storage medium and executed by the at least one processor, and are configured to utilize the color image and infrared image signals to form respective first and second maps. The first map has a first plurality of layers, and the second map has a second plurality of layers. Selected layers from each are paired and fused to form a feature pyramid that facilitates formulation of the classification and location data.

In accordance with another embodiment, a method of detecting a pedestrian includes a step of receiving from a visual image sensor, a visual image signal indicative of a visual image of an area. The next step includes receiving from a thermal image sensor, a thermal image signal indicative of a thermal image of the area. The visual image and thermal image signals are then transformed into classification and localization data by a processor executing instructions that applies a gated fusion unit to detect a pedestrian in the area.

In accordance with another embodiment, a controller-circuit facilitates detection of an object. The controller-circuit includes at least one processor and at least one storage medium. The processor is configured to receive a color image signal and a second image signal respectively received from a color camera and an image device. The processor executes instructions to transform the color image signal and the second image signal into respective first and second maps. The first map has a first plurality of feature layers, and the second map has a second plurality of feature layers. The selected feature layers from the first and second maps are paired and fused using gated fusion to at least in part form a feature pyramid that facilitates the transformation of the color image signal and the second image signal into classification data and location data associated with a detected object. The storage medium is configured to store the executable instructions retrieved by the at least one processor.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
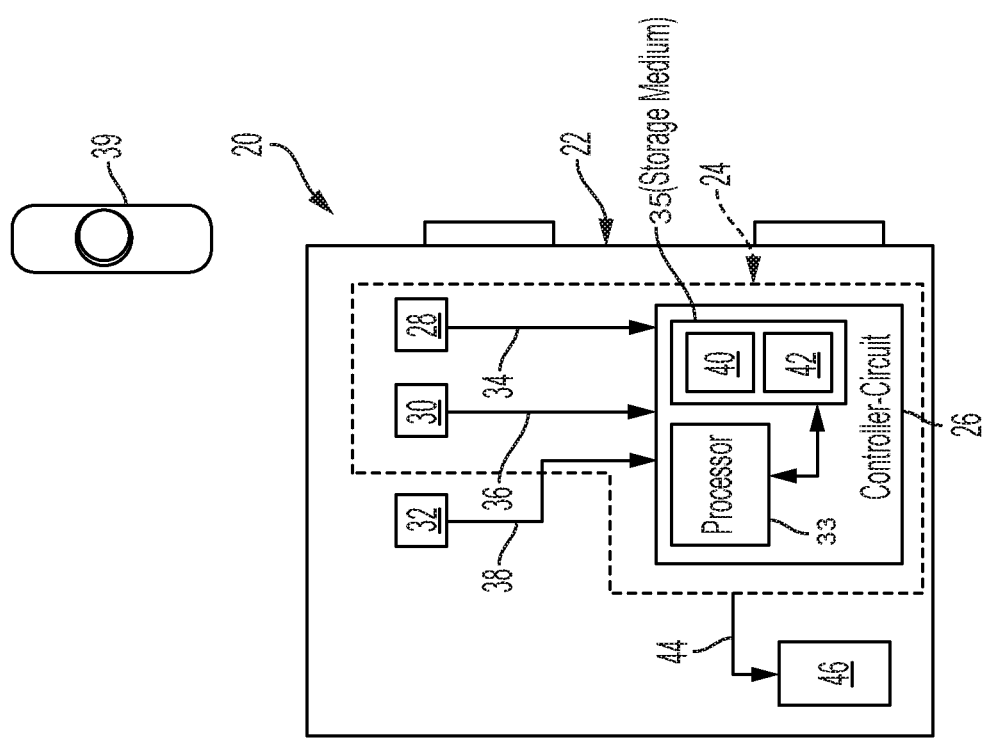
FIG. 1 is a schematic of a vehicle utilizing an object detection system.

Referring now to the Figures, where the invention will be described with reference to specific embodiments, without limiting same, a system 20 may include a vehicle 22, which may be an autonomous vehicle, and an object detection system 24 (e.g., pedestrian detection system) that may be included as part of the vehicle 22 as illustrated in FIG. 1. Although illustrated as a vehicle traveling upon a roadway, the vehicle 22 may be any form of transportation for people and/or cargo including marine vehicles, aviation vehicles, and others.

The vehicle 22 may include at least one controller-circuit 26 and a plurality of sensors or detectors (i.e., three illustrated as 28, 30, 32). The controller-circuit 26 includes one or more processors 33, and one or more electronic storage mediums 35. The processor 33 is any combination of one or more of a central processing unit (CPU), multiprocessor, microcontroller unit (MCU), digital signal processor (DSP), application specific integrated circuit, and others capable of executing software instructions or otherwise controllable to behave according to predetermined logic. The storage medium 35 is, optionally, any combination of read and write memory (RAM) and read only memory (ROM). The storage medium 35 may also include persistent storage, which can be any single one, or combination of, solid state memory, magnetic memory, and optical memory storing a computer program (i.e., application) with software instructions. In one example, the storage medium 35 may be non-transitory.

The multitude of sensors may include a visual light imaging sensor 28 (i.e., color camera), an infrared or thermal imaging sensor 30 (i.e., long-wavelength infrared sensor), a radar sensor or detector 32, and others. The sensors 28, 30, 32 may transmit respective signals (see arrows 34, 36, 38) to the controller-circuit 26, and may each serve multiple functions. For example, one or more of the sensors 28, 30, 32 may be part of, or utilized by, various systems of the system 20, or vehicle 22. Such systems may include a navigation system (e.g., satellite-based, GPS), a computer vision system, a radar system, a Light Detection and Ranging (LiDAR) system, a land-based system (e.g., beacon stations), and others. It is contemplated and understood that the infrared sensor 30 may be replaced with a LiDAR sensor.

The object detection system 24 may be configured to both recognize the presence of an object 39 (e.g., pedestrian) and locate the object with respect to the vehicle 22. In one embodiment, the entire object detection system 24 may be carried by the vehicle 22. In other embodiments, computer instruction aspects and computer processing and/or data storage may be conducted remotely from the vehicle 22 (conducted as part of a remote server function, e.g., cloud).

In one embodiment, the object detection system 24 includes at least two of the multitude of sensors 28, 30, 32, computer instructions and/or executable code 40, and data files 42. In one example, the object detection system 24 includes (or utilizes) the visual light imaging sensor 28 and the thermal imaging sensor 30. The object detection system 24 includes the processor 33, or at least utilizes the processor, to execute the computer instruction 40, and includes the storage medium 35, or at least utilizes the storage medium 35, to store the computer instructions 40 and data files 42.

In operation of the object detection system 24, the signals 34, 36 from the respective sensors 28, 30 are received by the controller-circuit 26, and processed and transformed by the processor 33 utilizing the computer instructions 40 and data file 42 stored in the storage medium 35. The processor 33, via the instructions 40 of the object detection system 24, may transform the signals 34, 36 into an object classification 41 and an object location 43 (i.e., classification and location data) as part of the data file 42 (see FIG. 2). Object classification 41 is the classification of each candidate or object into a foreground or background category. The object location 43 is the location upon a feature map (to be described below).

Utilizing, at least in-part, the classification and location data 41, 43 derived from the transformed input signals 34, 36, the controller-circuit 26 may then output a signal 44 (e.g., command signal, information signal, and others) to one or more devices 46 that may be external to the controller-circuit 26. Examples of such devices may include an information display screen for viewing by an occupant of the vehicle 22, a steering device, a braking device, an acceleration device, and others.

The sensors 28, 30 are, or may be part of, Deep Neural Network Detectors (DNND's) and may apply a one stage approach (i.e., as oppose to two stages). That is in one example, the DNND's 28, 30 may generally utilize Single Shot Detectors (SSD) 50A, 50B (i.e., each SSD 50A, 50B is, or includes, a series of feature maps) which eliminate proposal generation and subsequent feature resampling, and encapsulate all computation in a single network. Each SSD 50A, 50B adopts its backbone network (e.g., VGG16, i.e., see convolution layer 54A or 54B in FIG. 2) features in a pyramid structure to detect objects with different scales. That is, VGG16, or the convolution layers 54A, 54B, generate several layers, and the SSD extends the convolution layers 54A, 54B to several more layers 56A-64A and 56B-64B.

Features are formulated in a pyramid structure which contains both high level semantic information as well as low level localization context. This is beneficial to detect small objects from shallow layers and recognize large objects from deeper layers. It is understood and contemplated that the sensors 28, 30 in one example are respectively a color camera and a thermal imaging detector or camera, and are generally viewed as DNND's and/or SSD's when combined with at least portions of the computer instructions 40 and data file 42.

There generally exists a tradeoff between accuracy and speed among several modern object detectors, which may demonstrate a general conclusion that two-stage detectors achieve higher accuracy while one-stage detectors (i.e., SSD's) perform better in speed. In the present disclosure and in autonomous driving applications, which generally require real-time accurate detection, the network architecture of system 20 is based on the one-stage detector and improves system accuracy to be comparable, or superior to, more conventional two-stage detectors.

Overall Gated Fusion, Double SSD, Architecture:

SSD differs from Faster-RCNN in that its feature pyramid is constructed by multiple feature maps ranging from early to late stage convolutional layers. A typical "fusion" approach is to concatenate all feature maps from color and thermal modalities, which will double the number of anchors for the final classification layer. This is known as "stacked fusion."

The "gated fusion" structure of the object detection system 24 utilizes Gated Fusion Units (GFU's) that facilitate, or act as, an intermediate bridge between, for example, the color SSD and thermal SSD, which takes input from two feature maps and outputs a joint feature map without changing the size. The operation of the GFU is based on a gating mechanism endeavoring to keep the information delivered by reliable features while mitigating the effect of degraded features.

Figure 2:
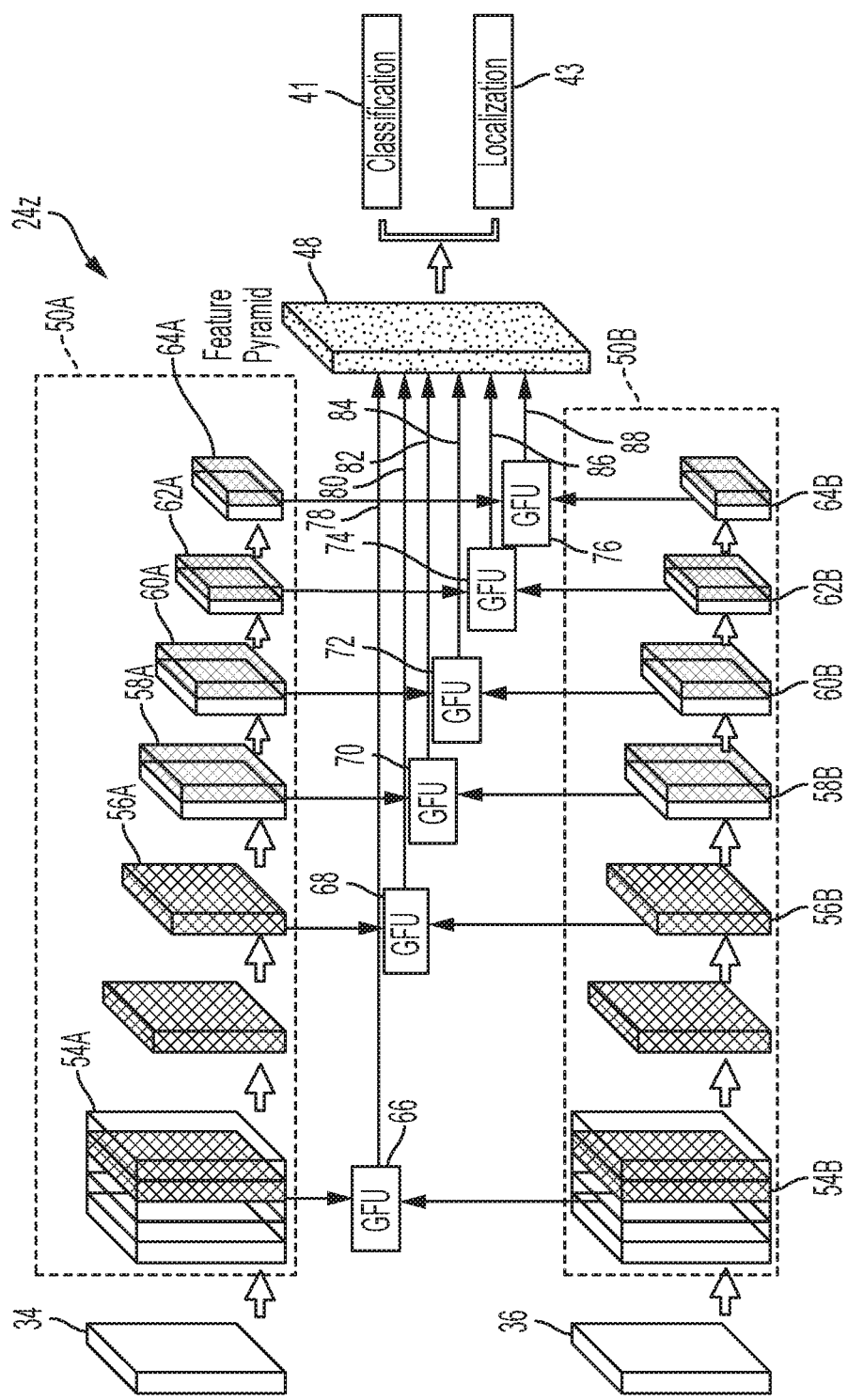
FIG. 2 is a schematic illustrating a fusion architecture of the object detection system.

Referring to FIGS. 1 and 2, the SSD 50A, 50B adopts a hieratical pyramid 48 formation of its feature maps of the data file 42. The hieratical pyramid 48 is generally composed of convolution layers 54A-64A and 54B-64B, where any single layer forms into a feature map. That is, the layers are relative to the model structure, and the feature maps are generated from the layers when input data is given.

The signal 34 (e.g., color image) is associated with, and evaluated by, the SSD 50A, and the signal 36 (e.g., thermal image) is associated with, and evaluated by, the SSD 50B. Shallow layers 54A, 54B with small receptive fields and high resolution focus on small object locations, while deep layers 64A, 64B with large receptive fields are comparatively suitable for large object prediction. This ensures system capability to handle multiple scale objects in a fast one-stage detector (i.e., SSD). The DSSD extends SSD by adding deconvolutional layers 56A, 56B onto higher level feature maps to increase their resolution.

More specifically, the sizes of the feature maps, or layers, 54A-64A and 54B-64B are different, from high resolution to low. For example, layers 54A, 54B are each 300×300, and layers 64A, 64B are each 20×20. Since they are processed from the same image, an object exists in all of the layers, but in different scales (i.e., resolutions).

Referring to FIG. 2, for the SSD 50A, 50B with, for example, a 300×300 input image size, the feature pyramid 48 is constructed by layer outputs, or convolution layers 54A, 56A, 58A, 60A, 62A, 64A associated with the map 50A, and convolution layers 54B, 56B, 58B, 60B, 62B, 64B associated with the map 50B. Map 50A generally mirrors map 50B since they are each associated with the same number of layers. For gated fusion architecture, as best shown in FIG. 2, the coordinated layers from each map 50A, 50B of the respective color image signal 34 and thermal image signal 36 are inputted into respective GFU's 66, 68, 70, 72, 74, 76. More specifically, layers 54A, 54B are inputted into GFU 66, layers 56A, 56B are inputted into GFU 68, layers 58A, 58B are inputted into GFU 70, layers 60A, 60B are inputted into GFU 72, layers 62A, 62B are inputted into GFU 74, and layers 64A, 64B are inputted into GFU 76.

Each GFU 66, 68, 70, 72, 74, 76 is configured to output a respective output 78, 80, 82, 84, 86, 88 to the feature pyramid 48. The GFU outputs are a joint combination of the SSD's 50A, 50B, and its dimension equals the dimension of one input. Therefore, the number of anchors (i.e., number of GFD's) from GFD-SSD maintain the same with a single SSD.

Although not specifically illustrated, anchors are pre-set potential locations and sizes for objects in the image. The location number could be hundreds, thousands, or more. During the process, the number is reduced, and the locations and sizes are updated.

Figure 3:
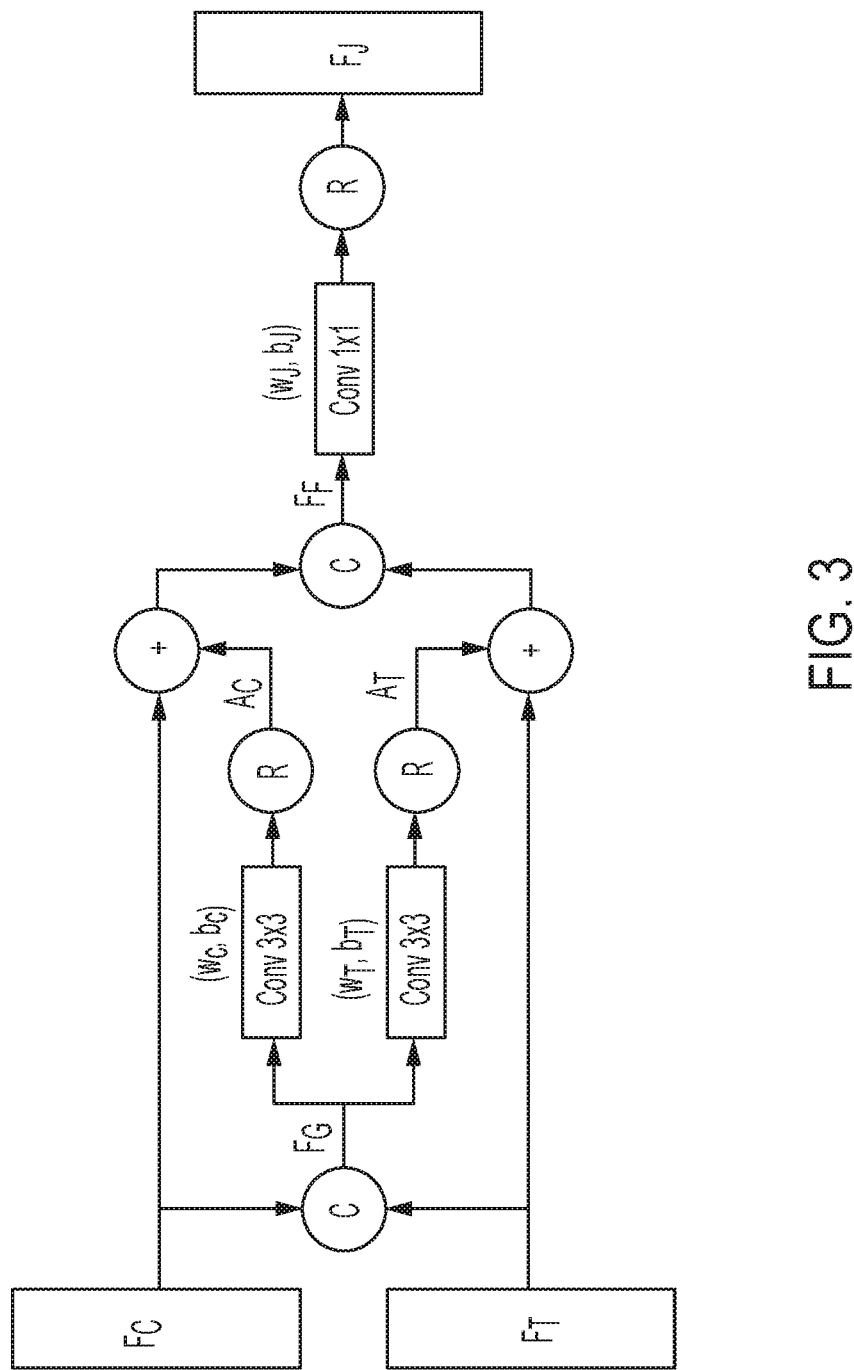
FIG. 3 is a schematic illustrating a gated fusion unit of the object detection system.

Gated Fusion Unit:

The GFU's 66, 68, 70, 72, 74, 76 (or a single GFU with multiple outputs) is the key component that adjusts the feature map combination between two modalities to form the feature pyramid 48. Referring to FIG. 3, $F_C$ and $F_T$ are the corresponding feature maps 50A, 5B associated with, or from, the color and thermal SSDs 28, 30 or signals 34, 36, and $F_G$ is the concatenation of $F_C$ and $F_T$.

In this example, two 3×3 kernels ($w_C$, $b_C$) and ($w_T$, $b_T$) are applied on $F_G$ separately, followed by a Rectified Linear Unit (ReLU) activation function on each path. $A_C$ and $A_T$ denote the activation outputs. An element-wise summation on $A_C$ and $A_T$ with $F_C$ and $F_T$ respectively, is then performed. $F_F$ denotes the concatenation of the two summations, which is then passed to a 1×1 kernel ($w_J$, $b_J$) to generate the joint feature output $F_J$. This method differs from more traditional methods in that ReLU is used instead of a sigmoid activation function to generate $A_C$ and $A_T$, and then performing element-wise summation instead of the more traditional product operation on $F_C$ and $F_T$. Since the output range of sigmoid function is (0, 1), multiplying a (0, 1) value on more traditional input feature maps is a complicated form of weighting mechanism. The present disclosure equivalently accomplishes this by using top detection layers outside GFU. The present method thus breaks the (0, 1) constraint by replacing the sigmoid with ReLU which has an output range (0, +∞), and by replacing the following product operation with summation. The two 3×3 kernels ($w_C$, $b_C$) and ($w_T$, $b_T$) in FIG. 3 are applied on the concatenated feature map $F_G$.

The operation of the GFU with regard to FIG. 3 is summarized in the following equations:

$$F_G = F_C \odot F_T$$

$$A_C = \text{ReLU}(w_C * F_G + b_C)$$

$$A_T = \text{ReLU}(w_T * F_G + b_T)$$

$$F_F = (F_C \Omega A_C) \odot (F_T \Omega A_T)$$

$$F_J = \text{ReLU}(w_J * F_F + b_J)$$

Figure 4:
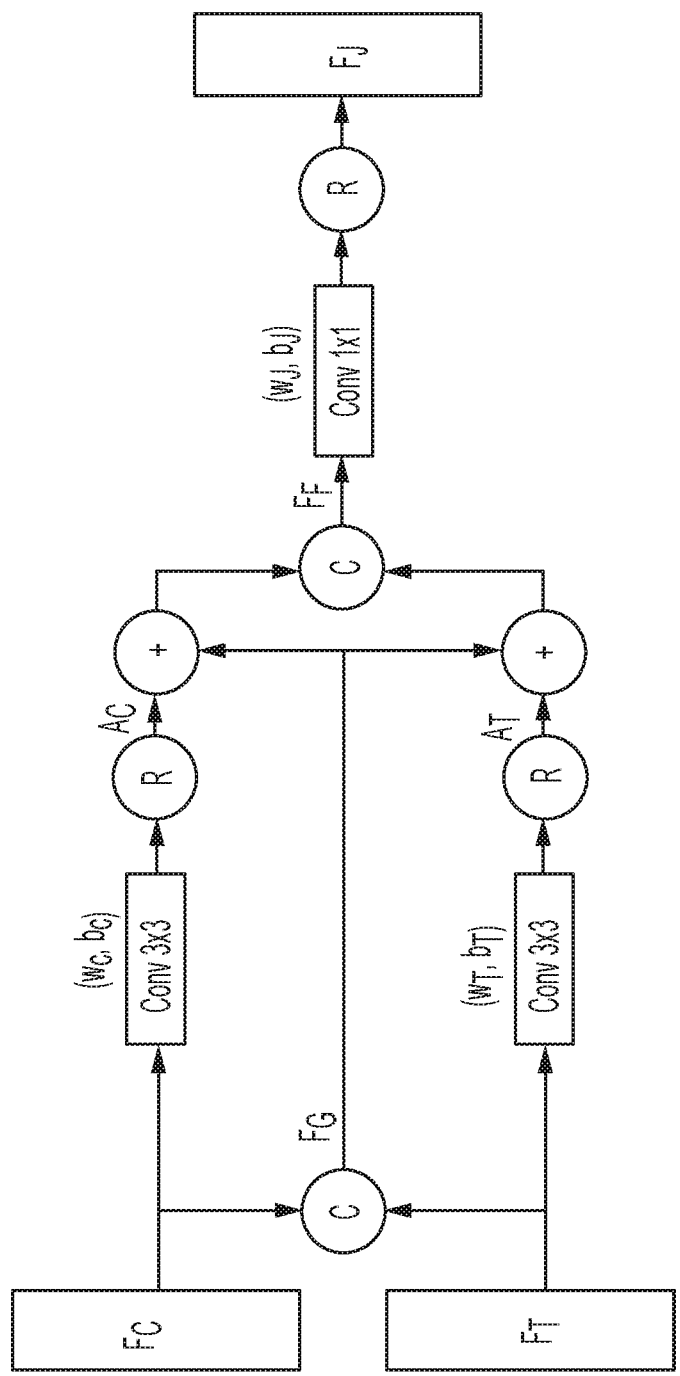
FIG. 4 is a schematic illustrating a second embodiment of a gated fusion unit.

Referring to FIG. 4, a second embodiment of the GFU(s) is illustrated. In this embodiment, the two 3×3 kernels ($w_C$, $b_C$) and ($w_T$, $b_T$) are not applied on the concatenated feature map $F_G$, instead, the kernels are applied on $F_C$ and $F_T$ individually. The intuition for this alternative design is that the GFU represented in FIG. 3 keeps the original inputs and learns operational adjustments from their combination, whereas the GFU represented in FIG. 4 learns adjustments directly from the original input.

The operation of the GFU with regard to FIG. 4 is summarized in the following equations:

$$F_G = F_C \odot F_T$$

$$A_C = \text{ReLU}(w_C * F_C + b_C)$$

$$A_T = \text{ReLU}(w_T * F_T + b_T)$$

$$F_F = (F_G \Omega A_C) \odot (F_G \Omega A_T)$$

$$F_J = \text{ReLU}(w_J * F_F + b_J)$$

Where "$\odot$" is concatenation, "$\Omega$" is element-wise summation, "$F_C$, $F_T$, $F_G$, $F_F$, $F_J$" are respective feature maps (i.e., layers 54A-64A and 54B-64B), "$A_C$ and $A_T$" are ReLU activation outputs, "$w_C$, $w_T$, and $w_J$" are kernel weights, and "$b_C$, $b_T$, and $b_J$" are kernel biases.

Figure 5:
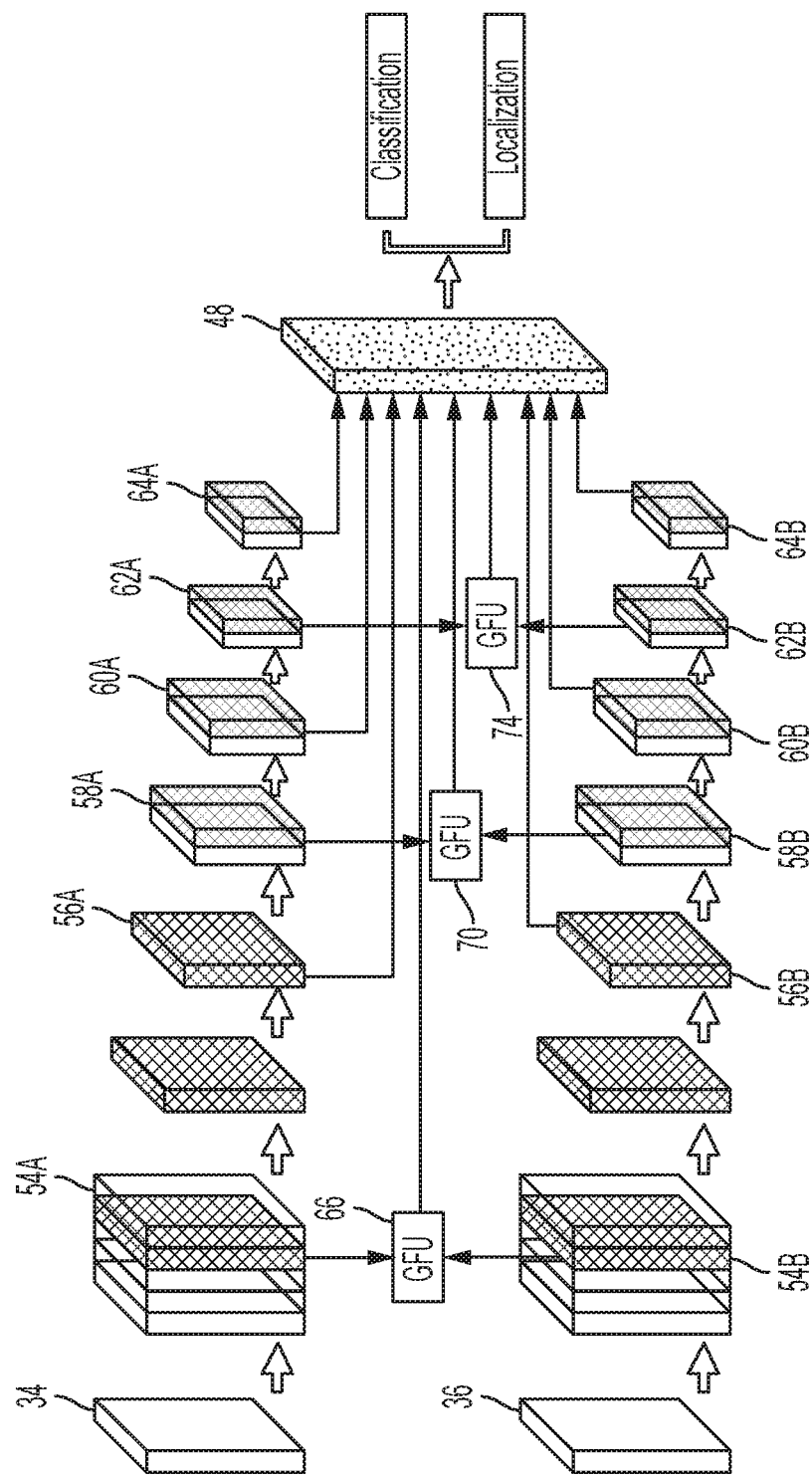
FIG. 5 is a schematic of a second embodiment of a fusion architecture.
Figure 6:
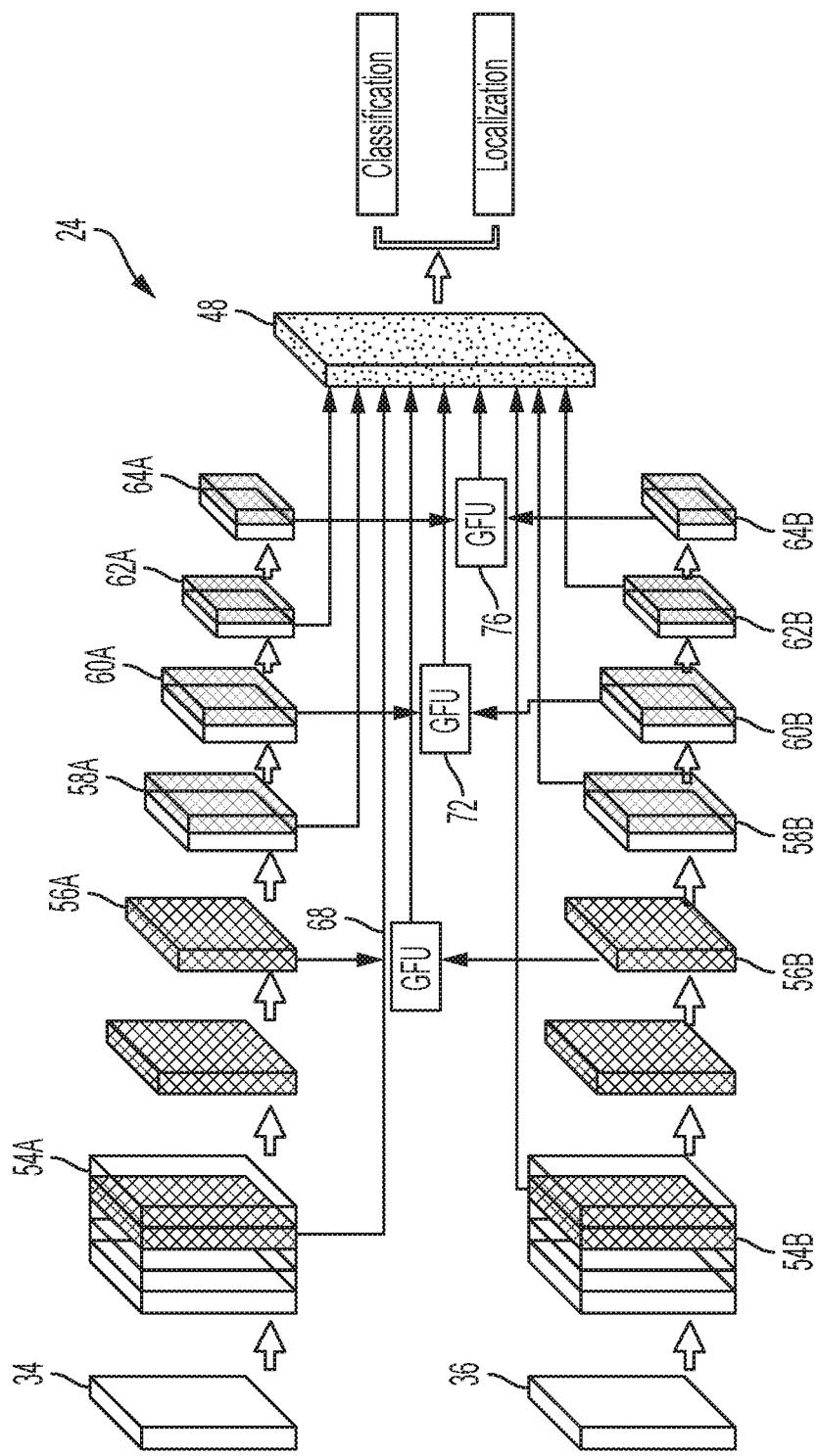
FIG. 6 is a schematic of a third embodiment of a fusion architecture.
Figure 7:
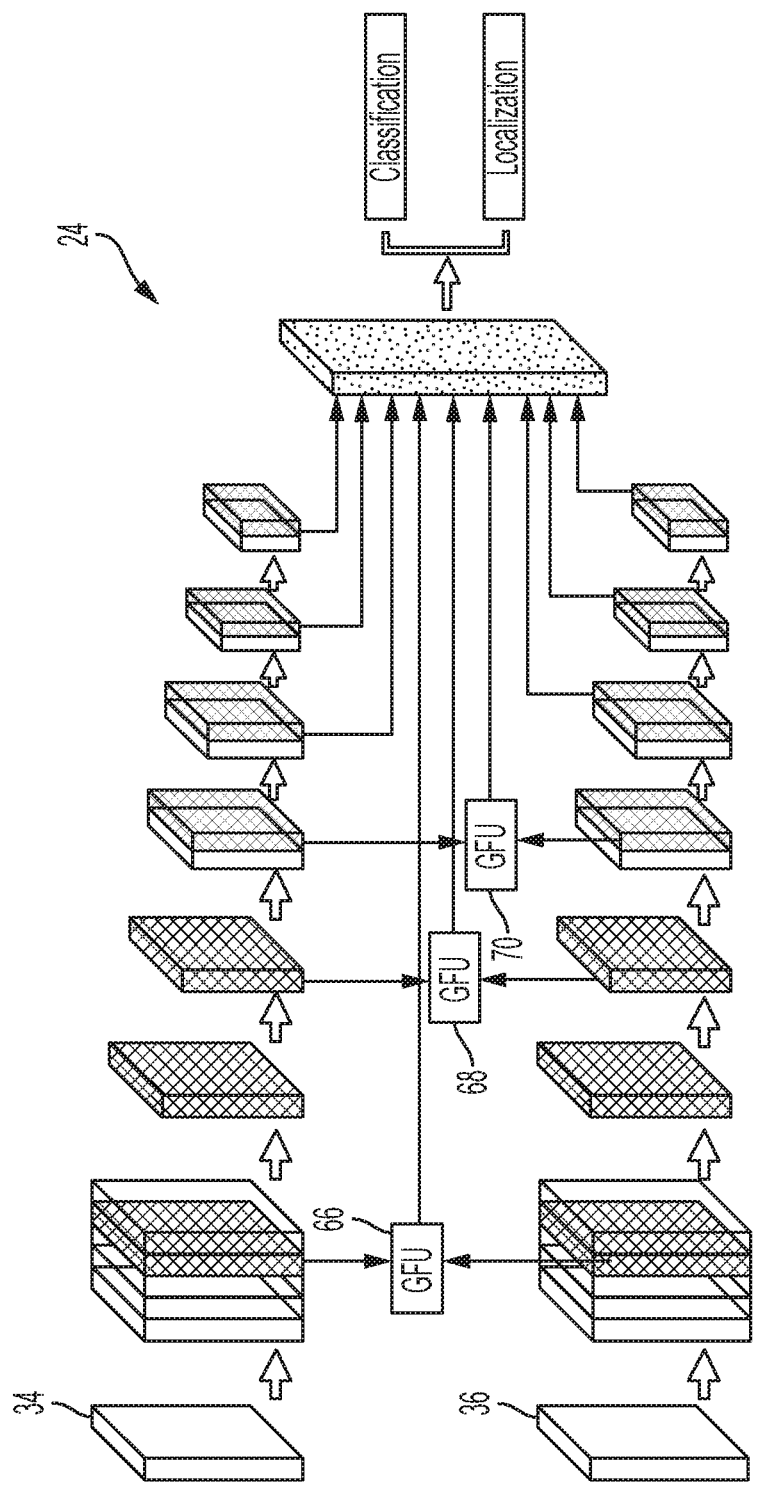
FIG. 7, is a schematic of a fourth embodiment of a fusion architecture.
Figure 8:
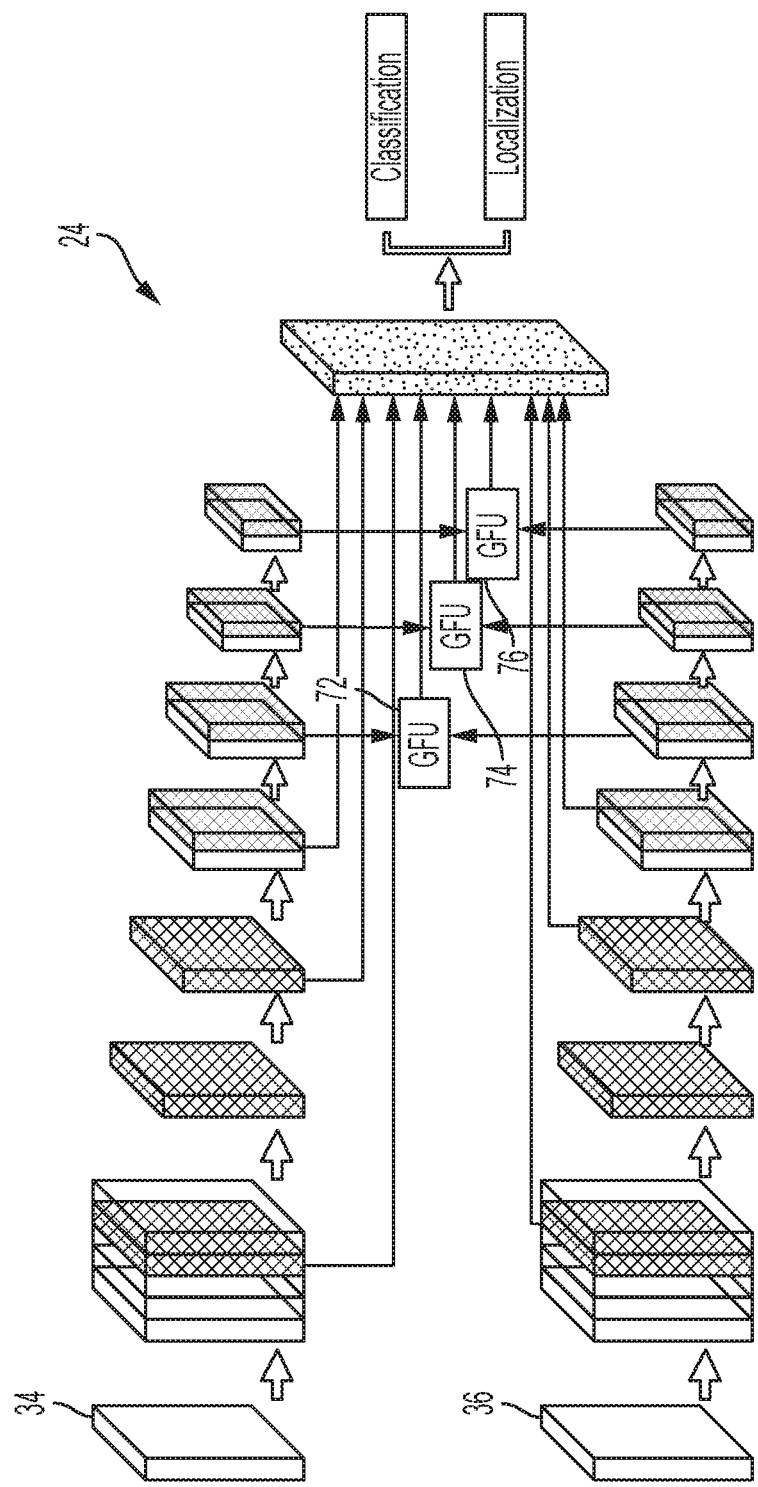
FIG. 8 is a schematic of a fifth embodiment of a fusion architecture.

Mixed Fusion Variations:

The gated fusion structure shown in FIG. 2 applies GFUs 66, 68, 70, 72, 74, 76 on all layers 54A-64A, 54B-64B of the feature maps 50A, 50B within the SSD's 50A, 50B (i.e., within the pyramid structure). Alternatively and referring to FIGS. 5-8, the mixed fusion selects a subset of feature maps for gated fusion and keep the remaining features in stack fusion. In one embodiment, a mixed-even fusion is illustrated in FIG. 5. In another embodiment, a mixed-odd fusion is illustrated in FIG. 6. In another embodiment, a mixed-early fusion is illustrate in FIG. 7. In yet another embodiment, a mixed-late fusion is illustrated in FIG. 8. Each embodiment is dependent upon which layers are selected to use the GFUs.

For example, the mixed-even fusion illustrated in FIG. 5, applies GFUs 66, 70, 74 to the respective layers 56A, 56B, 58A, 58B, 62A, 62B (i.e., gates the layers), and the layers 56A, 56B, 60A, 60B, 64A, 64B are stacked. The mixed-odd fusion illustrated in FIG. 6, applies GFUs 68, 72, 76 to the respective layers 56A, 56B, 60A, 60B, 64A, 64B, and the layers 54A, 54B, 58A, 58B, 62A, 62B are stacked. The mixed-early fusion illustrated in FIG. 7 applies GFUs on shallower feature maps (i.e. layers) and the mixed-late fusion illustrated in FIG. 8 applies GFUs on deeper layers. Since the SSDs 28, 30 use pre-set anchors which are associated with the feature pyramid 48, mixed fusion variations can result in a different number of anchors.

A larger number of anchors provides more potential object candidates, but also increases the required computational resources. For the input image size 512×512, as one example, the single SSD has an extra convolution layer (not shown) in the feature pyramid 48. Therefore, we let the extra convolution layer be gated in mixed-even and the mixed-late fusion architectures, and stacked in mixed-odd and mixed-early fusion architectures.

The various functions described above may be implemented or supported by a computer program that is formed from computer readable program codes, and that is embodied in a non-transitory computer readable medium. Computer readable program codes may include source codes, object codes, executable codes, and others. Computer readable mediums may be any type of media capable of being accessed by a computer, and may include Read Only Memory (ROM), Random Access Memory (RAM), a hard disk drive, a compact disc (CD), a digital video disc (DVD), or other non-transitory forms.

The terminology used in the description of the various described embodiments herein is for the purpose of describing particular embodiments only, and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes." "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Terms used herein such as component, application, module, system, and the like are intended to refer to a computer-related entity, either hardware, a combination of hardware and software, or software execution. By way of example, an application may be, but is not limited to, a process running on a processor, a processor, an object, an executable, a thread of execution, a program, and/or a computer. An application running on a server and the server, may be a component. One or more applications may reside within a process and/or thread of execution and an application may be localized on one computer and/or distributed between two or more computers.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A system comprising:
at least one processor configured to:
receive color image signals from a color camera and receive infrared image signals from an infrared camera,
form respective first and second maps, the first map having a first plurality of feature layers and the second map having a second plurality of feature layers,
pair and fuse selected feature layers from the first and second maps with a gated fusion unit (GFU) to at least in part form a feature pyramid,
wherein the GFU includes a Rectified Linear Unit (ReLU) activation function applied to one of a weighted first map or weighted second map and a weighted concatenated feature map of the respective first and second maps.

2. The system set forth in claim 1, wherein the feature pyramid is of equal dimension to at least one of a color image and an infrared image.

3. The system set forth in claim 2, wherein the system is a pedestrian detection system.

4. The system set forth in claim 2, wherein the infrared camera is a thermal imaging sensor.

5. The system set forth in claim 2, wherein the infrared camera is within a wavelength range of 7.5 to 13 micrometers.

6. The system set forth in claim 2, wherein the infrared camera is within a wavelength range of 0.75 to 1.3 micrometers.

7. The system set forth in claim 2, wherein the color camera and infrared camera are each at least a part of Deep Neural Network Detectors (DNNDs).

8. The system set forth in claim 7, wherein the first and second maps are Single Shot Detectors (SSDs).

9. The system set forth in claim 8, wherein each SSD adopts backbone network features in a pyramid structure to detect objects with different scales.

10. The system set forth in claim 8, wherein instructions stored in at least one storage medium are associated with at least one GFU configured to fuse selected layers from each one of the first and second maps to at least in-part form the feature pyramid.

11. The system set forth in claim 10, wherein the GFU applies the following formulas:

$$F_G = F_C \odot F_T$$

$$A_C = \text{ReLU}(w_C * F_G + b_C)$$

$$A_T = \text{ReLU}(w_T * F_G + b_T)$$

$$F_F = (F_C \Omega A_C) \odot (F_T \Omega A_T)$$

$$F_J = \text{ReLU}(w_J * F_F + b_J).$$

12. The system set forth in claim 10, wherein the GFU applies the following formulas:

$$F_G = F_C \odot F_T$$

$$A_C = \text{ReLU}(w_C * F_C + b_C)$$

$$A_T = \text{ReLU}(w_T * F_T + b_T)$$

$$F_F = (F_G \Omega A_C) \odot (F_G \Omega A_T)$$

$$F_J = \text{ReLU}(w_J * F_F + b_J).$$

13. A method comprising:
receiving, with at least one processor, visual image signals from a camera;
receiving, with the at least one processor, thermal image signals from a thermal camera;

forming, with the at least one processor, respective first and second maps, the first map having a first plurality of feature layers and the second map having a second plurality of feature layers;

pairing and fusing, with the at least one processor, selected feature layers from the first and second maps with at least one gated fusion unit (GFU) to at least in part form a feature pyramid; and applying, with the at least one GFU, a Rectified Linear Unit (ReLU) activation function to one of a weighted first map or weighted second map and a weighted concatenated feature map of the respective first and second maps.

14. The method set forth in claim 13, further comprising:

transforming the visual image signals and thermal image signals into respective first and second plurality of feature layers using convolution layers by instructions stored in at least one storage medium;

pairing at least a portion of layers between the first and second plurality of convolution layers; and applying the at least one GFU to the paired layers to generate at least one fused layer pair.

15. The method set forth in claim 14, further comprising:

outputting the at least one fused layer pair by the GFU to a feature pyramid.

16. A controller circuit, comprising:

at least one processor configured to:

receive a color image signal and a second image signal of an object respectively received from a color camera and an image device, execute executable instructions to transform the color image signal and the second image signal into respective first and second maps, the first map having a first plurality of feature layers and the second map having a second plurality of feature layers, and selected feature layers from the first and second maps are paired and fused with a gated fusion unit (GFU) to at least in part form a feature pyramid to facilitate a transformation of the color image signal and the second image signal into classification data and location data associated with the object; and at least one storage medium configured to store the executable instructions retrieved by the at least one processor, wherein the GFU includes a Rectified Linear Unit (ReLU) activation function applied to one of a weighted first map or weighted second map and a weighted concatenated feature map of the respective first and second maps.

17. The controller circuit set forth in claim 16, wherein the feature pyramid is of equal dimension to at least one of a color image indicative of the color image signal and a second image indicative of the second image signal.

18. The controller circuit set forth in claim 17, wherein the second image is a LiDAR image taken by a LiDAR device as the image device.

19. The controller circuit set forth in claim 17, wherein the second image is a thermal image taken by a thermal imaging camera as the image device.

20. The controller circuit set forth in claim 17, wherein the at least one GFU applies the following formulas:

$$F_G = F_C \odot F_T$$

$$A_C = \text{ReLU}(w_C * F_G + b_C)$$

$$A_T = \text{ReLU}(w_T * F_G + b_T)$$

$$F_F = (F_C \Omega A_C) \odot (F_T \Omega A_T)$$

$$F_J = \text{ReLU}(w_J * F_F + b_J).$$

21. The controller circuit set forth in claim 17, wherein the at least one GFU applies the following formulas:

$$F_G = F_C \odot F_T$$

$$A_C = \text{ReLU}(w_C * F_C + b_C)$$

$$A_T = \text{ReLU}(w_T * F_T + b_T)$$

$$F_F = (F_G \Omega A_C) \odot (F_G \Omega A_T)$$

$$F_J = \text{ReLU}(w_J * F_F + b_J).$$

* * * * *